United States Patent [19]

Kono et al.

[11] Patent Number: 4,723,836

[45] Date of Patent: Feb. 9, 1988

[54] HANDWRITTEN CHARACTER INPUT DEVICE

[75] Inventors: Yoshio Kono, Nara; Yukihiro Inoue, Kashihara, both of Japan

[73] Assignee: Sharp Kabushiki Kaisha, Osaka, Japan

[21] Appl. No.: 659,419

[22] Filed: Oct. 10, 1984

[30] Foreign Application Priority Data

Oct. 26, 1983 [JP] Japan .................... 58-201560
Nov. 24, 1983 [JP] Japan .................. 58-182472[U]

[51] Int. Cl.$^4$ .................... G02F 1/133; G09G 3/02
[52] U.S. Cl. ................. 350/331 R; 340/707; 350/338
[58] Field of Search ............. 340/707, 708, 784; 350/331 R, 338, 332-334

[56] References Cited

U.S. PATENT DOCUMENTS

| 3,846,580 | 11/1974 | Brenner | 178/19 |
|---|---|---|---|
| 4,061,418 | 12/1977 | Poensgen | 350/337 |
| 4,126,383 | 11/1978 | Doriguzzi et al. | 350/338 |
| 4,451,698 | 3/1984 | Whetstone | 178/19 |
| 4,497,977 | 2/1985 | Saito | 178/19 |

FOREIGN PATENT DOCUMENTS

0049676  3/1984  Japan ........................... 340/707

OTHER PUBLICATIONS

U.S. Journal: IBM Technical Disclosure Bulletin, vol. 14, No. 7, Dec. 1971, pp. 1963–1965.

Primary Examiner—Stanley D. Miller
Assistant Examiner—David Lewis
Attorney, Agent, or Firm—Birch, Stewart, Kolasch & Birch

[57] ABSTRACT

A handwritten character input device includes an opaque tablet or digitizer for inputting a handwritten character or figure into an apparatus. The tablet is of an electromagnetic induction type. The tablet is positioned under a liquid crystal display panel and an aluminum-evaporated film reflector is provided for the liquid crystal display. Preferably, the aluminum-evaporated film reflector is as thick as 1.0 micron or less. A conductive shield plate may be further provided between the tablet and a driving circuit substrate for the liquid crystal display panel. This shield plate serves to magnetically isolate the tablet from the driving substrate.

5 Claims, 5 Drawing Figures

PRIOR ART

HANDWRITTEN CHARACTER INPUT DEVICE

BACKGROUND OF THE INVENTION

The present invention relates to a handwritten character input device and, more particularly, to a structure of a handwritten character input device for inputting a handwritten character and figure into an apparatus, so that the inputted character and figure can be displayed in a display such as a liquid crystal display.

Conventionally, a handwritten character input device for inputting a handwritten character and figure into an apparatus such as a computer is called a tablet or a digitizer. FIG. 1 is a structure of a conventional tablet having a liquid crystal display. The liquid crystal display of the twisted nematic type comprises a first polarizer 1, a pair of substrates 2 and 3 sealing a liquid crystal layer 9, a second polarizer 4, and a reflector 5. Over the liquid crystal display, a transparent tablet or digitizer 6 is disposed which is provided with a substrate having a wiring of thin leads or transparent conductive film leads. An exciting pen 7 comes in contact with the surface of the tablet 6 to hand-write a character or figure, so that the character or figure can be input into the apparatus and, simultaneously, be displayed on the liquid crystal display.

However, the tablet must be transparent in the above structure, resulting in an expensive tablet. Further, the transparent conductive film is thick so as to make it less breakable. The reliability of such an input device is high.

SUMMARY OF THE INVENTION

Accordingly, it is an object of the present invention to provide an improved handwritten character input device that comprises an opaque tablet and a display for inputting a handwritten character or figure into an apparatus.

It is another object of the present invention to provide an improved handwritten character input device comprising an opaque tablet or digitizer disposed under a display such as a liquid crystal display panel.

It is a further object of the present invention to provide an improved structure of an aluminum-evaporated reflector for a liquid crystal display disposed under an opaque tablet or digitizer for inputting a handwritten character or figure into an apparatus.

It is yet a further object of the present invention to provide an improved conductive shield plate for preventing a driving substrate for a display such as a liquid crystal display from disturbing magnetic lines that are applied to an opaque tablet or digitizer.

Briefly described, in accordance with the present invention, a handwritten character input device comprises an opaque tablet or digitizer for inputting a handwritten character or figure into an apparatus such as a computer. The input tablet is of an electromagnetic induction type. The tablet is disposed under a display such as a liquid crystal display panel that is provided with an aluminum-evaporated film reflector. Preferably, the aluminum-evaporated film reflector is as thin as 1.0 microns or less.

In another preferred embodiment of the present invention, a conductive shield plate is further provided between the tablet and a driving circuit for the liquid crystal display. The shield plate carries some of the driver circuits and serves to magnetically isolate them from the tablet.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
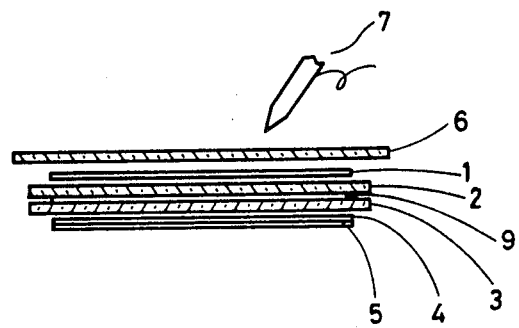
FIG. 1 is a sectional view of a conventional handwritten character input device.
Figure 2:
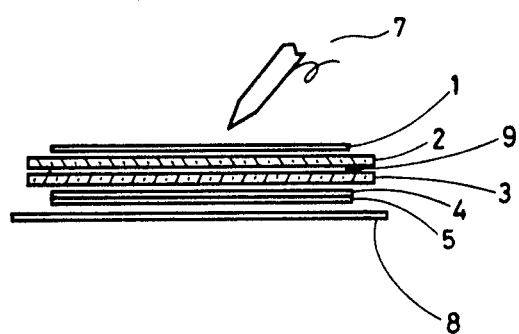
FIG. 2 is a sectional view of a handwritten character input device according to a preferred embodiment of the present invention.

FIG. 2 is a sectional view of a handwritten character input device according to a preferred embodiment of the present invention. This input device can serve as an input device of an apparatus such as a computer.

The input device is of an electromagnetic induction type. It is a display panel such as a liquid crystal display panel of the twisted nematic type, for example, comprising a first polarizer 1, a pair of glass substrates 2 and 3 sealing a liquid crystal layer 9, a second polarizer 4, and a reflector 5. The reflector 5 is provided for reflecting radiation toward the liquid crystal layer 9.

Preferably, the thickness of the first polarizer 1 is about 200 microns. The thickness of each of the substrates 2 and 3 is about 0.7 mm. The sum of the thickness of the second polarizer 4 and the reflector 5 is about 230 microns. These thicknesses are calculated so that magnetic lines induced by an exciting pen 7 can pass through the liquid crystal display panel.

An opaque tablet 8 is provided under the liquid crystal display panel according to a feature of the present invention. This tablet is of an electromagnetic induction type and its structure is conventional as used in a digitizer for a personal computer, which comprises a wiring substrate that has X-direction loop coils on one surface and Y-direction loop coils on the other surface. A switching controller is provided on the substrate, which comprises an analog switching Integrated Circuit. An end of each of the X- and Y-direction loop lines is short-circuited. Every line of the X- and Y-direction loop coils is isolated from and in parallel with one another on one surface. The X- and Y-direction loop coils are embedded in the tablet. Upon contact of the exciting pen 7 with the liquid crystal display panel, an electromotive force is induced in the respective loop coils. The address of a specific loop coil receiving a maximum value of the electromotive force is sent to the apparatus as the co-ordinate of the contact point of the exciting pen 7. The liquid crystal display panel and the tablet 8 thereunder are layered and integrated together.

If the reflector 5, conventionally made of aluminum, is a foil having a thickness of about 15 microns, an AC magnetic field induced by the exciting pen 7 causes an eddy current in the aluminum foil and the opaque tablet 8 cannot precisely detect any magnetic field that is produced by the exciting pen 7.

Therefore, according to a preferred embodiment of the present invention, an aluminum-evaporated layer is selected as the reflector 5 and its thickness is selected also to be 1 micron or less. Such an aluminum-evaporated film reflector 5 is an insulator. The generation of any eddy current can be reduced, so that the tablet 8 precisely detect the magnetic field.

Figure 3:
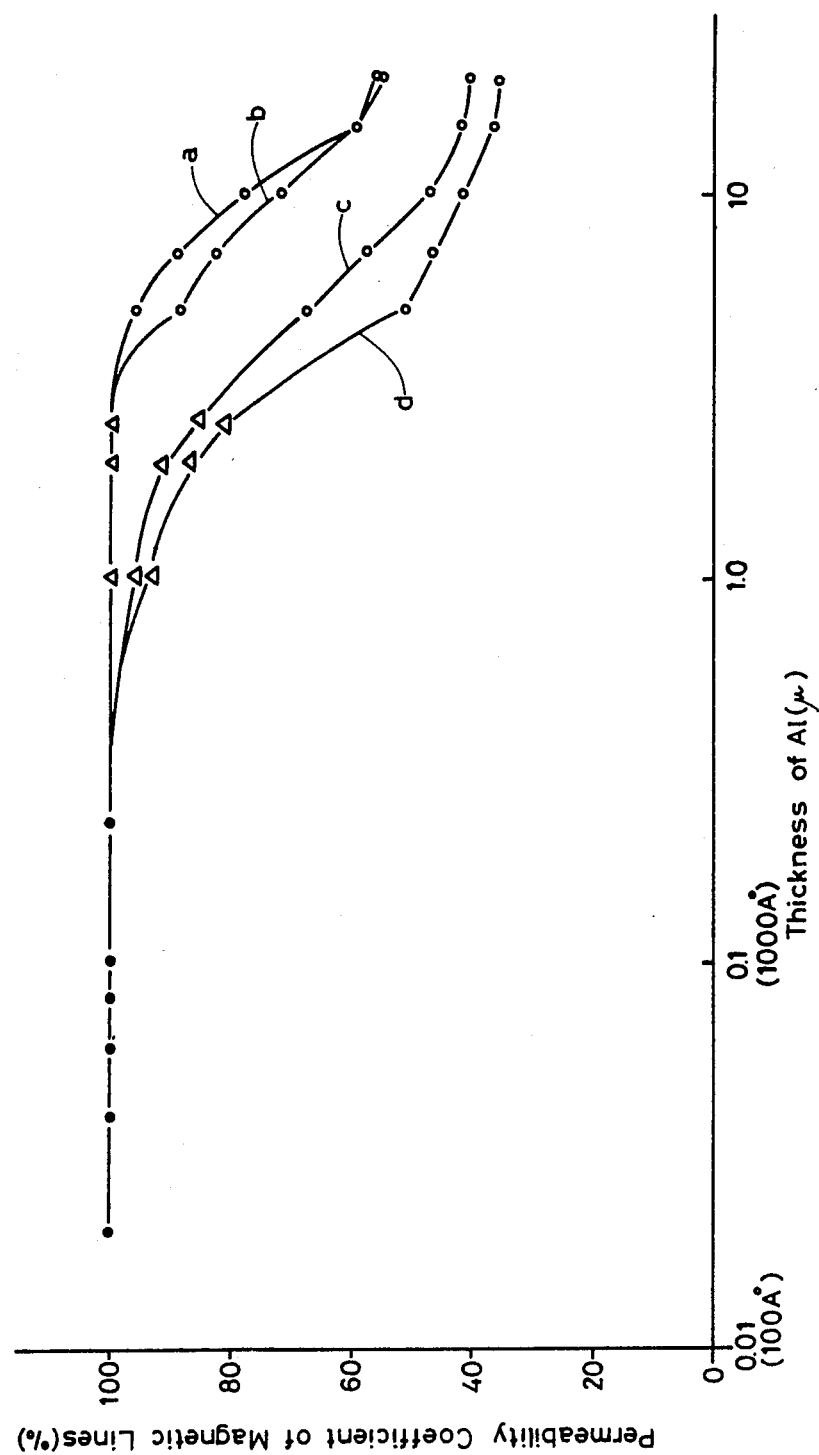
FIG. 3 is a graph showing a relationship between the thickness of an aluminum reflector and a permeability coefficient of magnetic lines.

FIG. 3 is a graph showing a relationship between the thickness of the aluminum reflector 5 and a premeability coefficient of magnetic lines. Electromotive data which are induced in coils and shown in FIG. 3 are obtained in the condition that an aluminum layer is interposed between the exciting pen 7 and the detection coils, assuming an actual tablet is used.

In FIG. 3, the respective "black dot", "triangle", and "white dot" data are given in the following conditions:
black dot: an aluminum material is evaporated with a thickness of 0.02-0.23 microns on a film of a thickness of 50±5 microns
triangle: an aluminum material is evaporated with a thickness of 1.0-2.5 microns on a glass substrate of a thickness of 1±0.1 mm
white dot: an aluminum foil of a thickness of 5 microns or more The film and the glass substrate can pass magnetic lines so freely that the permeability coefficient is not changed by its thickness.

Data with characters "a"-"d" of FIG. 3 are given with the following frequencies of rectangular waves applied to the exciting pen 7:
a=50 Hz
b=100 KHz
c=200 KHz
d=300 KHz The graph of FIG. 3 shows that, when the aluminum layer is thicker than 1.0 microns, the permeability coefficient of magnetic lines is remarkably reduced as the frequency raises and, on the other hand, that, when it is as thin as 1.0 microns or less, the permeability remains constant and cannot be lowered even when the frequency changes.

In the above-described preferred embodiment of the present invention, the magnetic line permeability can be decreased by making the aluminum layer thicker than 1.0 microns. In other words, reduction of magnetic shield effect by the aluminum layer can be achieved by making the aluminum layer thinner. It may be possible for this purpose that the conductivity or the magnetic permeability of the aluminum layer is decreased by making the layer thicker.

Figure 4:
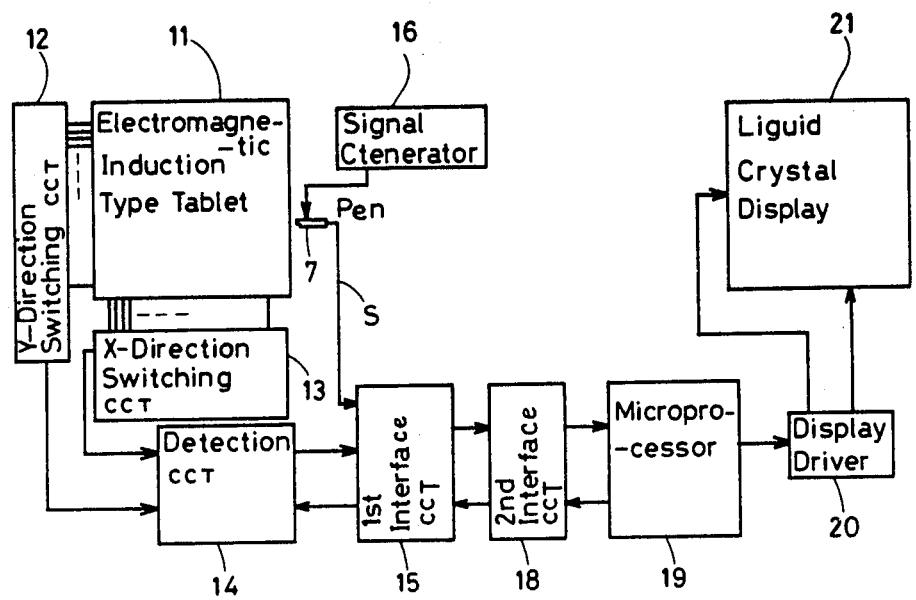
FIG. 4 is a block diagram of a circuit of the handwritten character input device of the present invention.

FIG. 4 is a block diagram of the handwritten character input device of the present invention. The circuit of FIG. 4 is wired for the system as shown in FIG. 2.

This circuit comprises an electromagnetic induction type tablet 11, a Y-direction switching circuit 12, an X-direction switching circuit 13, a detection circuit 14, a first interface circuit 15, a second interface circuit 18, a signal generator 16, the exciting pen 7, a mircoprocessor 19, a display driver 20, and a liquid crystal display 21.

The electromagnetic induction type tablet 11 relates to the opaque tablet 8 of FIG. 2, comprising the X- and the Y-direction sensing loop coils as stated above. The Y-direction switching circuit 12 is provided for switching the Y-direction sensing loop coils. The X-direction switching circuit 13 is provided for switching the X-direction sensing loop coils. The detection circuit 14 is responsive to the sensing signals from the X- and the Y-direction switching circuits 12 and 13 for detecting the co-ordinate data of the exciting pen 7. The first interface circuit 15 is responsive to the co-ordinate data from the detection circuit 13 for providing a specific signal format. The signal generator 16 serves to provide AC signals to the exciting pen 7. A signal "S" is generated from the exciting pen 7 as shown in FIG. 4 when this pen 7 magnetically activates the tablet 11. The second interface circuit 18 is provided for inputting and outputting signals as communicating with the first interface circuit 15. The microprocessor 19 is responsive to the inputted co-ordinate data for setting and resetting bits of addresses in a display memory in the display driver 20. The liquid crystal display 21 relates to the liquid crystal display panel of FIG. 2. The display 21 is of a dot matrix type, having a resolution equivalent to that of the tablet 11. This display 21 is driven with the display driver 20.

With the circuit arrangement of FIG. 4, the exciting pen 7 comes in direct contact with the surface of the liquid crystal display 21. Since the magnetic lines caused by the exciting pen 7 can reach the tablet 11 through the liquid crystal display 21, the handwritten character information is detected by the detection circuit 14 and then entered into the interface circuits 15 and 18, and further the microprocessor 19. With the help of the display driver 20, the inputted handwritten character information can be displayed on the liquid crystal display 21.

Figure 5:
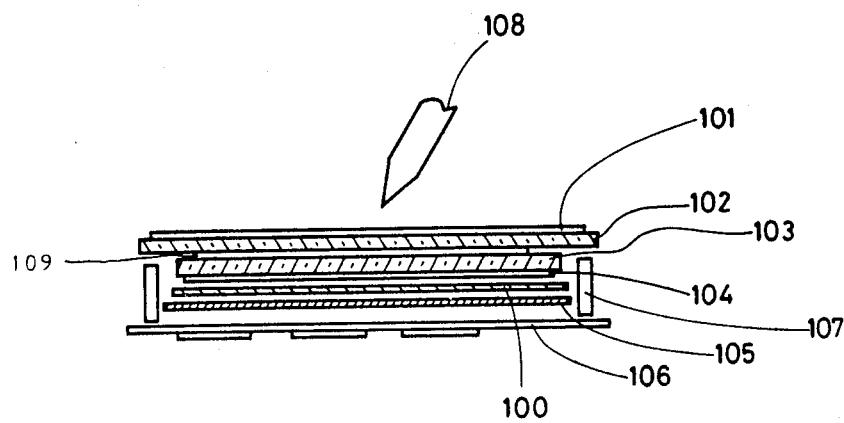
FIG. 5 is a sectional view of a handwritten character input device according to another preferred embodiment of the present invention.

FIG. 5 is a sectional view of a structure of another handwritten character input device according to another preferred embodiment of the present invention.

The system of FIG. 5 is constructed with an electromagnetic induction type tablet 100, a polarizer 101, a pair of glass substrates 102 and 103 sealing a liquid crystal layer 109, a reflector and polarizer 104. As stated above, the tablet 100 serves to detect the magnetic lines caused by an exciting pen 108. A substrate 106 is provided for carrying some driving circuits for the liquid crystal display.

In this preferred embodiment of the present invention, a conductive shield plate 105 made of metal or any conductive material is provided for shielding the exciting pen magnetic lines from reaching the substrate 106, so that the exciting pen magnetic lines cannot be disturbed. It may become to position the tablet 100 near the substrate 106.

If the conductive shield plate 105 is absent, the magnetic lines caused by the exciting pen 108 can reach the substrate 106, and the magnetic lines can be disturbed, resulting in poor exactness. If the tablet 100 is positioned far from the substrate 106 at 1 cm or more, no problem will occur. However, a demand for compactness of the total system may make such a clearance impractical.

In the first preferred embodiment of the present invention, it may be evident that a material of the reflector 5 can be freely selected for the reflector 5.

While only certain embodiments of the present invention have been described, it will be apparent to those skilled in the art that various changes and modifications may be made therein without departing from the spirit and scope of the present invention as claimed.

What is claimed is:

1. A handwritten character input device comprising:

exciting means for exciting and inputting character information by hand-writing a character;

electromagnetic induction tablet means, responsive to said exciting means, for sensing the character inputted by said exciting means, said electromagnetic induction tablet being opaque;

liquid crystal display panel means, responsive to the detection of said electromagnetic induction tablet means, for displaying the inputted character; and an aluminum-evaporated film reflector serving to reflect radiation toward said liquid crystal display panel means, said aluminum-evaporated film reflector being disposed between said liquid cyrstal display panel and said electromagnetic induction tablet means and having a thickness of 1.0 micron or less;

wherein said exciting means comes in contact with a first top side of said liquid crystal display means with said electromagnetic induction tablet means being positioned beneath a second, bottom side of said liquid crystal display means.

2. The device of claim 1, further comprising:

a substrate carrying driving circuitry that drives said liquid crystal display panel means; and a conductive shield plate positioned between said electromagnetic induction table means and said substrate.

3. The device of claim 1 wherein said liquid crystal display panel means comprises:

a first polarizer, forming said first top side of said liquid crystal display panel means;

a first glass substrate and a second glass substrate disposed beneath said first polarizer, and sealing a liquid crystal layer; and a second polarizer, disposed beneath said first and second glass substrates, forming said second bottom side of said liquid crystal display panel means.

4. The device of claim 3 wherein said first polarizer has a thickness of approximately 200 microns, said first and second substrates each have a thickness of approximately 0.7 millimeters and said second polarizer and said aluminum evaporated film reflector have a combined thickness of approximately 230 microns.

5. The device of claim 3 further comprising:

driving means for activating said liquid crystal display means, said driving means being disposed on a third substrate, said third substrate being positioned such that said electromagnetic induction table means is between said liquid crystal display panel means and said third substrate; and a conductive shield plate disposed between said third substrate and said electromagnetic induction tablet means.

* * * * *